US007130578B2

(12) United States Patent
Jarett

(10) Patent No.: US 7,130,578 B2
(45) Date of Patent: *Oct. 31, 2006

(54) CLOSED-LOOP POINTING SYSTEM FOR WIRELESS COMMUNICATION WITH SPOT BEAMS AND WIDE-AREA BEAMS

(75) Inventor: Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/349,294

(22) Filed: Jan. 22, 2003

(65) Prior Publication Data

US 2004/0203444 A1 Oct. 14, 2004

(51) Int. Cl.
*H04B 7/185* (2006.01)
(52) U.S. Cl. ................. 455/13.3; 455/430
(58) Field of Classification Search .............. 455/12.1, 455/13.3, 427–430, 69, 63.1, 63.4, 562.1, 455/13.1; 342/352, 354, 358–360, 368
See application file for complete search history.

(56) References Cited

U.S. PATENT DOCUMENTS

| 4,599,619 | A | * | 7/1986 | Keigler et al. | .............. 342/352 |
| 4,630,058 | A | * | 12/1986 | Brown | ....................... 342/359 |
| 6,150,977 | A | * | 11/2000 | Wilcoxson et al. | ......... 342/355 |
| 6,825,806 | B1 | * | 11/2004 | Liu et al. | .................... 342/359 |
| 2004/0242152 | A1 | * | 12/2004 | Jarett | ........................ 455/12.1 |

* cited by examiner

*Primary Examiner*—Nguyen T. Vo
(74) *Attorney, Agent, or Firm*—Ostrager Chong Flaherty & Broitman

(57) ABSTRACT

A wireless communication system includes platforms that generate spot beams and wide-area beams. The system includes a network operations controller that receives signals from user terminals. User terminals determine the signal strengths of the spot beams and the wide-area beams and a ratio may therefore be calculated between the spot beam and the wide-area beams. Based upon the ratio of the spot beam strength and the wide-area beam strength, the network operations controller may adjust the orientation of the platforms relative to the earth to correct for pointing errors and, the network operation controller may compensate as is best possible depending on the type of antenna, a correction for distortion in the antenna.

20 Claims, 3 Drawing Sheets

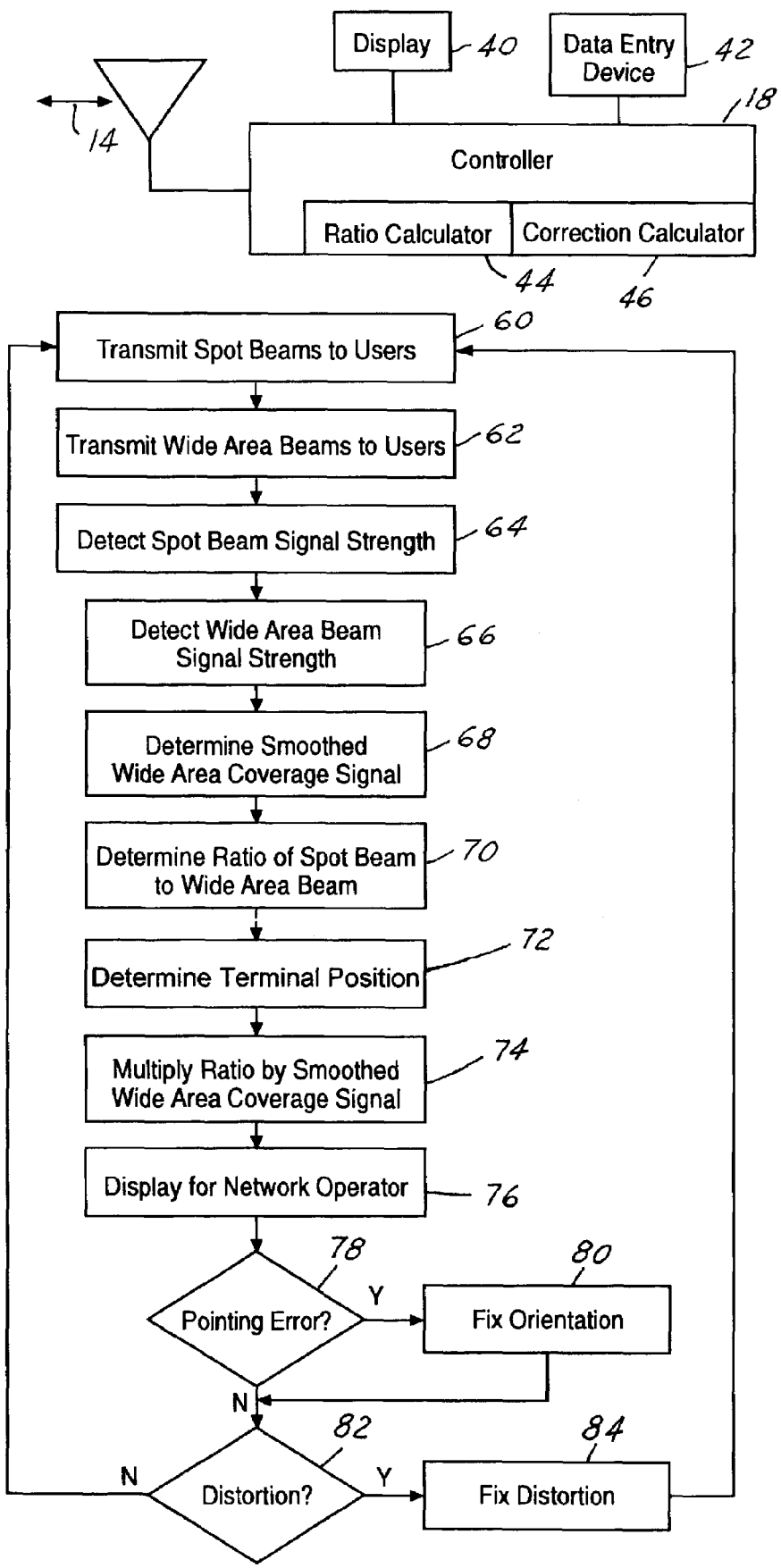

CLOSED-LOOP POINTING SYSTEM FOR WIRELESS COMMUNICATION WITH SPOT BEAMS AND WIDE-AREA BEAMS

TECHNICAL FIELD

The present invention relates generally to a wireless communication system, and more particularly, to a wireless communication system that generates both wide-area beams and spot beams.

BACKGROUND ART

Satellite and other wireless communication platforms often employ a large number of narrow spot beams that form a cellular coverage of a wide geographic area. It is preferred that the alignment of the spot beams is maintained so that complete coverage of the geographic area is maintained. The spot beam patterns are nominally fixed unless the platform is perturbed, or as the antenna characteristics change. The device itself may be perturbed by various forces including the gravitational effects of various heavenly bodies. The antenna's characteristics may change in response to factors such as sun-induced warping. Spot beam pattern changes may be simulated by computer but cannot be easily measured in an operational system.

Satellites systems typically employ star trackers to help maintain the alignment of the satellite. However, even if the satellite is accurately maintained, the antenna may still contribute to pointing errors. Star trackers are expensive and add mass to the satellite. One goal of satellite implementations is to reduce the mass of the satellite. Thus, it would be desirable to eliminate such components as a star tracker.

Communication systems sometimes use closed-loop beacon tracking systems. Such systems use a transmitter on the ground and one or more receiving beams on the satellite. A closed-loop system operates to null a signal. When the tracking signal is nulled, the antenna is correctly pointed at the beacon location. Even though the antenna is pointed correctly, the antenna pattern may still be incorrect. Beacon tracking systems also add hardware and mass to the communication platform.

It would therefore be desirable to eliminate star trackers or beacon tracking systems in a communication platform while allowing the communication platform to be accurately positioned and adjusted relative to the beam pattern.

SUMMARY OF THE INVENTION

The present invention provides a communication system that provides closed-loop determination for both pointing errors and antenna distortion errors.

In one aspect of the invention, a wireless communication system that generates spot beams and wide-area beams comprises a plurality of spot beam signal strength detectors that generate a plurality of spot beam signal strength signals. The system further includes a plurality of wide-area beam signal strength detectors that generate a plurality of spot beam signal strength signals. A controller is coupled to the plurality of spot beam signal strength detectors and the plurality of wide-area beam signal strength detectors. The controller determines ratios of the spot beam signal strength signals and the wide-area beam signal strength signals. Pointing errors and distortion errors are determined in response to the ratios. The system may then command a change in the satellite antennas or position of the satellite to correct the distortion and pointing errors.

In a further aspect of the invention, a method for operating a wireless communication system comprises transmitting a spot beam and detecting spot beam signal strength at a ground terminal. The method further comprises transmitting a wide-area beam and detecting a wide-area beam signal strength at the ground terminal.

The method further comprises determining a ratio of the spot beam signal strength and the wide-area signal strength and determining a pointing error and distortion error in response to the ratio.

One advantage of the invention is that by having the capability for closely monitoring the beam positions, a system employing more than one platform may be easily implemented so that both systems can provide coordinated beam coverage. Another advantage of the invention is that by providing a closed-loop system rather than an open-loop system, a lower link margin needs to be accounted for. By providing a closed-loop system pointing-induced degradation which would otherwise be about 1 dB or more, does not need to be provided and thus overall system capacity may be increased.

Other aspects and advantages of the present invention will become apparent upon the following detailed description and appended claims, and upon reference to the accompanying drawings.

BRIEF DESCRIPTION OF THE DRAWINGS

FIG. 4 is a block diagrammatic schematic view of a network operations controller of the present invention.

FIG. 5 is a flow chart of the operation of the communication system of the present invention.

BEST MODES FOR CARRYING OUT THE INVENTION

Figure 1:
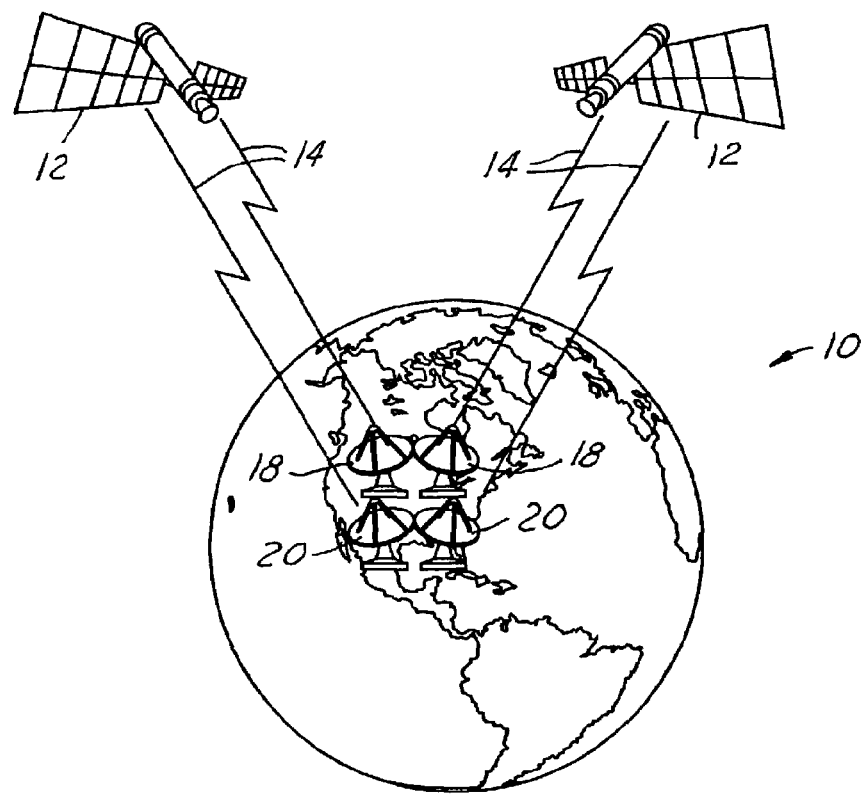
FIG. 1 is a high level system view of the present invention.
Figure 3:
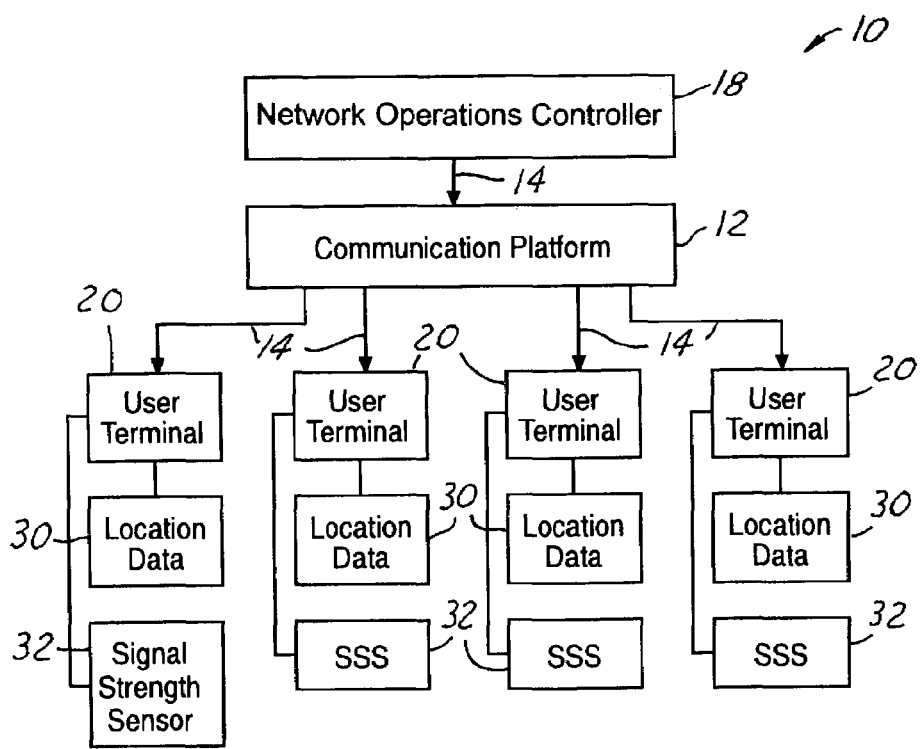
FIG. 3 is a block diagrammatic view of a system according to the present invention.

In the following figures the same reference numerals will be used to identify the same components in the various views.

While the present invention is illustrated with respect to a satellite-based communication platform, various types of communication platforms, including a stratospheric platform, may benefit from the present invention.

Referring now to FIG. 1, a communication system 10 is illustrated having two communication platforms 12 that direct communication signals 14 to earth 16. Communication signals are also directed from the earth 16 to platforms 12. A pair of network operation controllers 18 and a pair of user terminals 20 is also illustrated on earth 16. Network operation controller 18 may provide telemetry command and control communication signals to satellites 12 for example to correct pointing and antenna errors. Although only network operation controllers 18 are illustrated more or less may be provided. Also, only two user terminals 20 are illustrated. As will be further described below, several user terminals are desired for each of the spot beam signals generated by the platforms 12.

Platforms 12 are illustrated as satellites. However, the present invention is equally applicable to stratospheric platforms. If platforms 12 are satellites, the satellites may be low earth orbit, middle earth orbit, geosynchronous orbit, high earth orbit, or inclined orbits.

User terminals 20 may be one of a variety of types of user terminals including fixed terminals and mobile terminals. Fixed terminals may include business-based or home-based operations. Mobile terminals may include various types of mobile terminals including vehicle-based, handheld terminals, laptop computers, personal digital assistants and the like.

Figure 2:
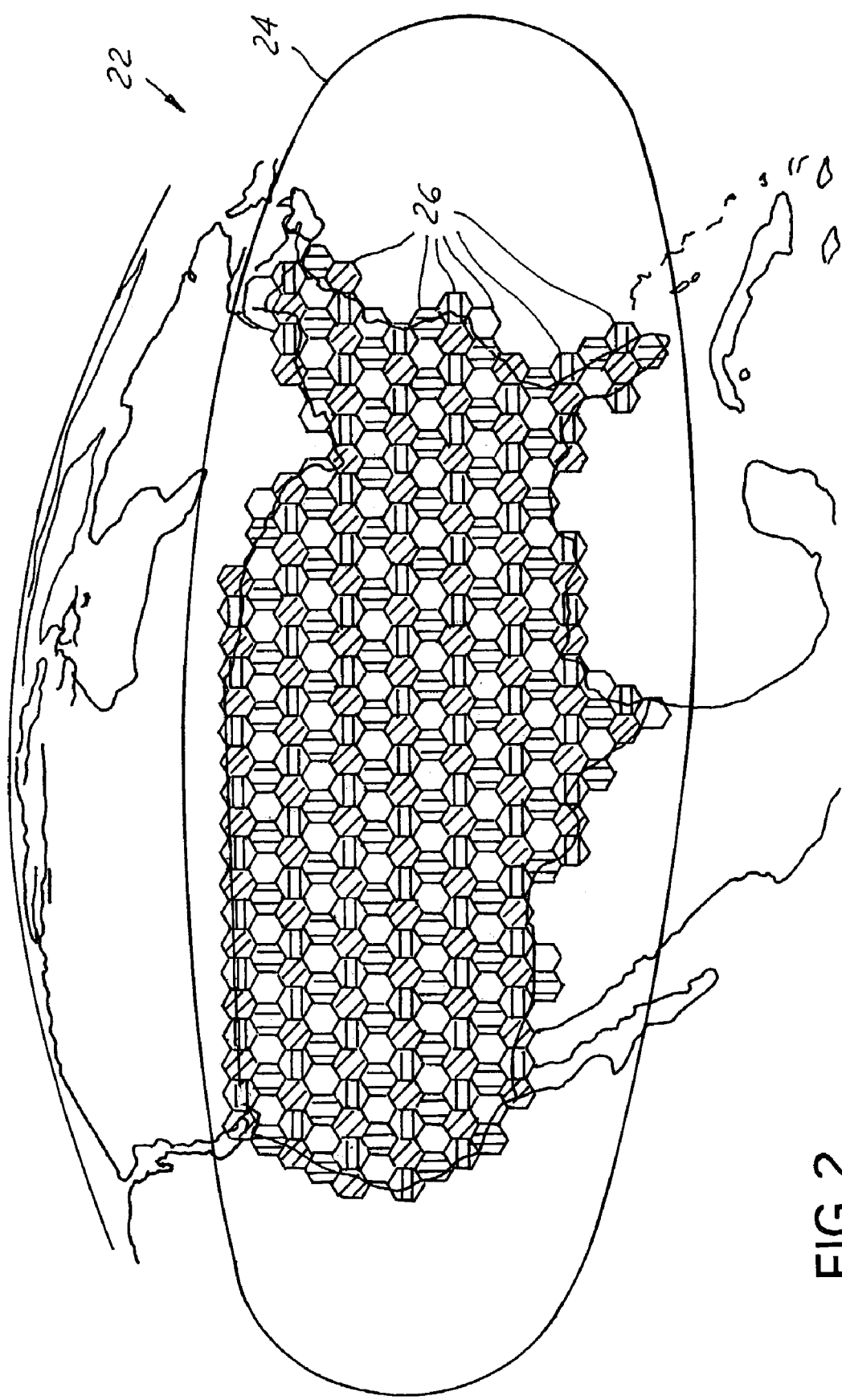
FIG. 2 is a representational view of spot beam over the continental US as formed by the present invention.

Referring now to FIG. 2, a map 22 of the continental US is illustrated having a wide-area beam 24 and a plurality of spot beams 26. Wide-area beam 24 is illustrated as a single beam. However, in implementation, the wide-area beam may actually be comprised of a number of beams such as four beams. Spot beams 26 are illustrated having four different colors in a repeating pattern. Each spot beam is set forth so that it does not interfere with an adjacent beam. The spot beams may be generated by one platform or a number of platforms such as the two platforms shown in FIG. 1. If two platforms are used to generate the spot beams, careful control must be exercised so that coverage is maintained over all the spot beams 26.

Referring now to FIG. 2, communication system 10 is illustrated in further detail. Communication system 10 includes network operation controller 18 as described above and a plurality of user terminals 20. Each user terminal 20 may be used for communicating to and receiving signals from network operations controller 18 through communication signals 14. Each user terminal may also include a position sensor 30 that generates location or position signal.

A signal strength sensor 32 is also provided. Signal strength sensor 32 may provide the signal strength for a wide-area beam by generating a wide-area beam signal strength signal and may generate a spot beam signal strength signal in response to the signal strength of a spot beam. The information provided by sensors 30 and 32 may be provided to network operations controller 18 through the communication platform 12.

Referring now to FIG. 4, network operations controller 18 is illustrated in further detail. Network operations controller may be coupled to a display device 40 and to a data entry device 42. Display 40 may, for example, be a screen display that generates a map illustrating the various pointing areas in the various spot beams. Data entry device 42 may, for example, be a touch screen or keyboard.

Controller 18 is preferably microprocessor-based and may perform various calculations. Therefore, controller 18 may be programmed to be a ratio calculator 44 for calculating the ratio between a spot beam signal strength signal and the wide-area beam signal strength signal.

A correction calculator 46 may also be performed by controller 18. Correction calculator 46 may determine the amount of adjustment of the platform to position it properly and to adjust the antenna to align the spot beams properly. These functions will be further described below.

Controller 18 receives and transmits communication signals 14 through an antenna 48.

Referring now to FIG. 5, a method for operating the communication system 10 is illustrated in further detail. In step 60, spot beams are transmitted to users using one or more platforms. In step 62, wide-area beams are transmitted to users. In step 64 the spot beam signal strengths are determined by the user terminals. In step 66 the wide-area beam signal strengths are detected. Preferably, many ground user terminals are employed each of which has the capability to measure and report the signal strength for any requested signal. Because the spot beam signal strength at the user terminal may vary greatly due to the user terminal's performance, local obstructions, user terminal pointing error, and for any number of causes, the present invention seeks to determine the ratio of the spot beam signal to the wide-area beam signal strength and thus this ratio depends only on the relative strengths of the two signals. In step 70 the ratio of the spot beam signal to the wide-area beam signal is determined. Preferably, the measurements of the signal strengths are prescheduled to minimize the load imposed on the communication links and the effect of that load on paying traffic.

The present invention determines a smooth wide-area coverage signal. This is done by locally averaging and then geographically smoothing the absolute signal strength measurements for the wide-area coverage beams determined in step 68. The resulting wide-area coverage performance includes the performance of the downlink antenna, pointing effects and any wide area weather effects. This step may also be displayed for a network operator but the pattern itself has insufficient resolution to be a basis for pointing control.

In steps 74, the terminal positions are also determined when providing the wide-area beam signal strength signal and the spot beam signal strength signal. The ratio data is then multiplied by the smooth wide-area coverage signal determined in step 72. The product of the smooth wide-area coverage signal and the ratio signal is determined. The result is, for each spot beam, a highly accurate estimate of the actual spot beam pattern, independent of weather and other factors that equally affect the spot and wide-area beams. The estimate may be displayed in color graphic form for the network operator as a performance monitoring tool in step 76. The display is thus a real-time spot performance indicator. The pattern may then be compared to an ideal pattern and in step 78, determine if a pointing error is present in the orientation of the platform. In step 80, if a pointing error is determined the orientation or position of the platform is changed by generating a pointing error signal and communicating the pointing error signal to the platform so that the platform may adjust its relative pointing position.

In step 78, if no pointing error is determined or in step 80 if the orientation has been fixed, the system determines whether distortion is present in step 82. Distortion is the amount the spot beams change, which may be manifested in shape and size of the beam. In step 84 the distortion of the antenna is fixed and will depend on the particular antenna design. For example, in a phased array antenna, the weighting of the antenna elements to change the relative angle of the beams may be performed. In other situations, the antenna may be adjusted to maximize business goals. For example, the system may be adjusted to maximize coverage and reduce pointing errors in large metropolitan areas.

As can be seen, the overall mass of the spacecraft may be reduced by not having to provide star trackers or beacon tracking devices. The present invention advantageously allows the beam pattern to be generated by multiple platforms. Since the platform beams may be controlled precisely, they may be coordinated precisely.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A wireless communication system generating spot beams and a wide-area beam comprising:
   a plurality of spot beam signal strength detectors generating a plurality of spot beam signal strength signals;
   a plurality of wide-area beam signal strength detectors generating a plurality of wide-area beam signal strength signals; and
   a controller coupled to the plurality of spot beam signal strength detectors and the plurality of wide-area beam signal strength detectors, said controller determining ratios of said spot beam signal strength signals and said wide-area beam signal strength signals, determining a pointing error and a distortion error in dependence on the ratios, and controlling the spot beams to compensate for said pointing and distortion errors.

2. A system as recited in claim 1 wherein said controller determines a smoothed wide-area beam signal.

3. A system as recited in claim 2 wherein said controller determines said pointing error and said distortion error in dependence on the ratios and the smoothed wide-area beam signal.

4. A system as recited in claim 2 wherein said controller multiplies said ratios by said smoothed wide-area beam signal to form a product, and said controller determines said pointing error and said distortion error in dependence on said product.

5. A system as recited in claim 1 further comprising a plurality of ground terminals, each of said ground terminals comprising a respective one of the plurality of spot beam signal strength detectors and a respective one of the plurality of wide-area beam signal strength detectors.

6. A system as recited in claim 5 wherein each of said ground terminals comprises a respective position sensor generating a position signal.

7. A system as recited in claim 6 wherein said controller generates said pointing error and said distortion error in dependence on said position signal.

8. A system as recited in claim 1 wherein a first portion of the plurality of spot beams are generated at a first device and a second portion of the plurality of spot beams are generated at a second device.

9. A system as recited in claim 1 further comprising a geographic display generated in dependence on said ratios.

10. A system as recited in claim 1 further comprising a phased array antenna and means for adjusting the weighting of elements of said phased-array antenna in dependence on said distortion error.

11. A method for operating a wireless communication system comprising:
   transmitting a spot beam from a platform toward a relatively small geographic area within which a ground terminal is located;
   detecting a spot beam signal strength at the ground terminal;
   transmitting a wide-area beam that covers a relatively large geographic area wider than and including said relatively small geographic area;
   detecting a wide-area beam signal strength at the ground terminal;
   determining a ratio of spot beam signal strength and wide-area beam signal strength;
   determining a pointing error and a distortion error in dependence on the ratio; and
   transmitting a corrected spot beam from said platform to correct said pointing and distortion errors.

12. A method as recited in claim 11 wherein said platform comprises a satellite.

13. A method as recited in claim 11 wherein said platform comprises a stratospheric platform.

14. A method as recited in claim 11 further comprising the step of reorienting or repositioning said platform or a communication device thereof in dependence on said pointing error prior to transmitting said corrected spot beam.

15. A method as recited in claim 11 further comprising the step of adjusting the weighting of elements of a phased-array antenna of said platform in dependence on said distortion error prior to transmitting said corrected spot beam.

16. A method for operating a wireless communication system that transmits a plurality of spot beams and a wide-area beam, comprising the following steps:
   transmitting a plurality of spot beams toward respective relatively small geographic areas within which a respective one of a plurality of ground terminals is located;
   transmitting a wide-area beam toward a relatively large geographic area that includes said relatively small geographic areas;
   generating spot beam signal strength signals at the plurality of ground terminals;
   generating wide-area beam signal strength signals at the plurality of ground terminals;
   generating respective position signals for each of the plurality of ground terminals;
   determining a plurality of ratios of spot beam signal strength and wide-area beam signal strength for each of said ground terminals;
   determining a pointing error and a distortion error in dependence on the ratio and the position signals; and
   transmitting a plurality of corrected spot beams from said platform to correct said pointing and distortion errors.

17. A method as recited in claim 16 further comprising the step of generating a smoothed wide-area coverage signal from the wide-area beam signal strength signals, wherein the pointing error and the distortion error are determined also in dependence on the smoothed wide-area coverage signal.

18. A method as recited in claim 16 further comprising the step of correcting the pointing error by reorienting or repositioning a communication device that transmits the spot beams.

19. A method as recited in claim 16 further comprising the step of correcting the distortion error by adjusting the weighting of elements of a phased-array antenna of a communication device that transmits the spot beams.

20. A method as recited in claim 16 further comprising the step of generating a display in dependence on the plurality of ratios.

* * * * *